United States Patent [19]

Arditty et al.

[11] Patent Number: 4,548,631
[45] Date of Patent: Oct. 22, 1985

[54] PROCESS AND DEVICE FOR MANUFACTURING A FIBER KEEPING A CIRCULAR POLARIZATION

[75] Inventors: Hervé Arditty, Marly-le-Roy; Philippe Graindorge, Magny-les-Hameaux, both of France

[73] Assignee: Thomson-CSF, Paris, France

[21] Appl. No.: 559,246

[22] Filed: Dec. 8, 1983

[30] Foreign Application Priority Data

Dec. 10, 1982 [FR] France .................. 82 20767

[51] Int. Cl.$^4$ .......................................... C03B 37/025
[52] U.S. Cl. ............................................ 65/3.1; 65/2; 65/3.3; 65/3.44
[58] Field of Search .............. 65/2, 3.1, 3.11, 3.3, 65/18.2, 3.44; 264/1.5, 2.6, 2.7, 103, 324, 248

[56] References Cited

U.S. PATENT DOCUMENTS

| | | | |
|---|---|---|---|
| 3,010,146 | 11/1961 | Warthen | 65/10.1 X |
| 3,327,461 | 6/1967 | Wyatt | 264/103 X |
| 3,499,194 | 3/1970 | Schmick | 65/2 |
| 4,028,081 | 6/1977 | Marcatili | 65/2 |
| 4,360,372 | 11/1982 | Maciejko | 65/4.21 |
| 4,426,215 | 1/1984 | Murphy | 65/4.21 |
| 4,427,717 | 1/1984 | Gauthier | 264/1.5 X |
| 4,439,221 | 3/1984 | Smyth et al. | 65/4.21 |

FOREIGN PATENT DOCUMENTS

| | | |
|---|---|---|
| 3010005 | 2/1981 | Fed. Rep. of Germany . |
| WO82/00635 | 3/1982 | World Intel. Prop. Org. . |
| WO83/00232 | 1/1983 | World Intel. Prop. Org. . |
| 2023127 | 12/1979 | United Kingdom . |

OTHER PUBLICATIONS

Navy Technical Disclosure Bulletin, vol. 5, No. 12, Dec. 1980, Washington, D.C. (US), S. C. Rashleigh, "Fabrication of Circularly Birefringent Single Mode Fibers", pp. 7-12.

Primary Examiner—Kenneth M. Schor
Attorney, Agent, or Firm—Oblon, Fisher, Spivak, McClelland & Maier

[57] ABSTRACT

The invention provides a process for forming a fiber keeping a circular polarization and a device for implementing this process.

This process consists, during drawing and twisting of the fiber from a formable material source, in remelting on the surface a part of the volume of said fiber in a zone where it is subjected to twisting stresses.

4 Claims, 10 Drawing Figures

PROCESS AND DEVICE FOR MANUFACTURING A FIBER KEEPING A CIRCULAR POLARIZATION

BACKGROUND OF THE INVENTION

1. Field of the Invention

The present invention relates to a process for manufacturing a fiber keeping circular polarization and a device for implementing this process.

2. Description of the Prior Art

The monomode fibers usually manufactured for telecommunications always present a small amount of linear birefringence and circular birefringence. Consequently, these fibers keep neither linear polarization nor circular polariization.

It is possible to make the fiber very linear birefringent by breaking up the circular symmetry to the advantage of a planar symmetry.

It is also possible to consider a reverse method, which consists in introducing a high circular birefringence so as to keep the circular polarization.

One solution for creating this circular polarization consists in subjecting the glass fiber to a static twisting stress, for example applied externally by twisting between its two ends: one effect of twisting this fiber is to introduce a circular birefringence therein.

The present invention provides a process for keeping a twisted state in the fiber. It allows a fiber to be obtained with helical structure or chiralic structure. But this fiber may be of any section, it may thus have a complex geometry.

Any twisting stress creating a circular birefringence, a process of the prior art described in the European patent application published under the No. 0 078 733, consists in twisting a fiber which is already drawn out and maintaining it mechanically in this stress condition, by coating the fiber with a rigid envelope such as an additional glass layer.

The disadvantages of this process are:

on the one hand, fragilization of the fiber by introducing high stresses at the periphery of the fiber, on the other hand, the need of external mechanical fixing means "maintaining" the twist.

The invention overcomes these disadvantages by envisaging a step for remelting the surface of the fiber carried out simultaneously with steps for drawing and twisting same.

SUMMARY OF THE INVENTION

The invention provides a process for manufacturing a fiber keeping circular polarization, comprising the following operations carried out simultaneously:

drawing out this fiber along an axis from a source of formable material;

twisting this fiber about the drawing out axis which creates in this fiber twisting stresses;

surface remelting of a part of the volume of the fiber in a zone where this fiber is subjected to these twisting stresses.

It further provides a manufacturing device for implementing such a process.

BRIEF DESCRIPTION OF THE DRAWINGS

The invention will be better understood and other characteristics will appear from the following description with reference to the accompanying figures in which.

DESCRIPTION OF THE PREFERRED EMBODIMENT

The so-called monomode fibers are made from fibers in which the solution to the propagation equations is unique, but whose mode is degenerated. Two modes, whose propagation constants are identical but whose polarizations are orthogonal, are then propagated in the fiber. This degenerescence moreover may be lifted by any anisotropy of the fiber, whether it is intrinsic or due to external disturbances. The consequence is that the "real" fibers are bimode, each of the modes being polarized orthogonally to the other, which causes on the one hand a variation in the propagation speed from one polarization to the other which will reduce the passband which the fiber may transmit and, on the other hand, the random coupling between the two modes will produce a random polarization condition at the output of the fiber.

This problem is resolved by imposing a high propagation constant difference between the two natural modes transmitted in the fiber so as to minimize the coupling between these two modes. One incident wave which is polarized according to natural modes remains then in this mode and the fiber may then be considered as being monomode for this incident polarization.

To induce a difference between the propagation constants of two modes, linear birefringence may be created in the fiber; the two modes are then two orthogonal linear polarizations, or of circular birefringence, the two modes are in this case the two right and left circular polarizations. These birefringences are induced by elasto-optical effect under the action of external stresses, either nipping, or twisting.

In determining the amplitude of the birefringence, the stresses taken into account are those acting on the material in which the light is propagated, namely the core of the fiber.

Figure 1:
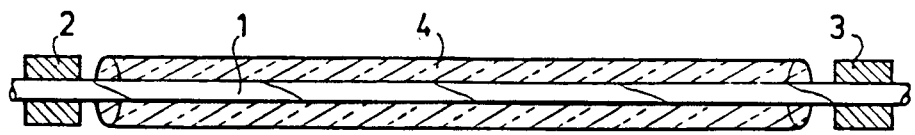
FIG. 1 illustrates schematically the process of the prior art.

Any twisting stress creating a circular birefringence, the process of the prior art used for keeping circular polarization in the fiber, consists in twisting a fiber which has already been drawn and maintaining it mechanically in this stress condition, as shown in FIG. 1.

Figure 2:
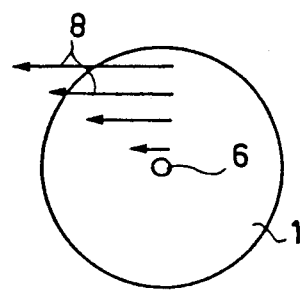
FIG. 2 illustrates the disadvantages of such a process.

Considering a fiber 1 already manufactured, starting with a preform for example, and by simple drawing out, if it is twisted with a great number of turns while holding it at its two ends, it only remains to "immobilize it" for it to keep its polarization conservation properties, by rigid sheathing 4 for example. This sheath 4 may be formed by coating the fiber with a rigid envelope such as an additional glass layer. In FIG. 1 is shown a fiber already manufactured which has then been twisted, while being held at its ends 2 and 3, a rigid sheath 4 then being added to immobilize it. The disadvantages of this process are:

on the one hand, fragilization of the fiber by introducing high stresses 8 at the periphery of the fiber which are shown in FIG. 2;

on the other hand, the need for external mechanical fixing means "maintaining" the twist.

Figure 3:
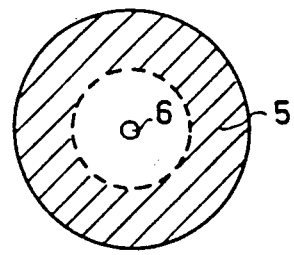
FIG. 3 illustrates a particular aspect of the manufacturing process of the invention.

The process proposed consists in subjecting the fiber to twisting stresses during drawing out thereof and in remelting a part of the volume of the fiber situated at the periphery thereof, as shown in FIG. 3; a zone 5 being the remelting zone. This results in releasing the stresses at the periphery whereas they are maintained in the core 6 of the fiber. When the external twisting stresses applied to the fiber are removed, the field of the stresses is divided up so that the stresses supported by the periphery are very small. The overall balance of the stresses in the fiber must be zero. This remelting of the fiber on the surface is carried out on a fiber without twisting maintenance protection, that is to say on the silica fiber before any deposit of a protecting sheath.

The result is such that a central zone is subjected to twisting stresses practically equal to those applied during drawing, whereas the stresses supported by the remelted part are negligeable. In fact, the integral of the moments of the stresses in each of the zones are opposed, which means that the mean stresses of each of the zones are the ratio of the areas of the zones, so very small close to the periphery and very high close to the core. This remelting process allows simultaneously high stresses at the core of the fiber and very small stresses at the periphery of this fiber as well as an absence of residual twisting.

The process of the invention consists then in stressing the fiber by twisting and remelting it on the surface when it is under stress. In volume, for example, ¾ to 9/10 of the fiber are affected by the remelting, the core not being affected thereby; that is to say a central part of about 10 to 20 micrometers is not affected.

Thus, during drawing of the fiber, rotation is imparted to the fiber by a machine rotating at N rpm. In addition, the fiber is drawn out at a speed of M meters/min. Conservation of the number of turns applied to the fiber leads to uniform twisting of the fiber by N/M turns per meter. A fiber portion of unit length L (for example 1 meter) may then be considered separately.

Figure 4:
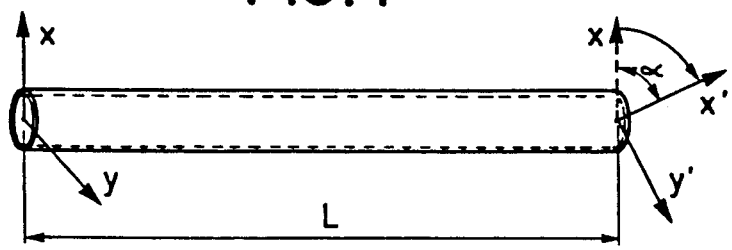
FIGS. 4 to 8 illustrate the manufacturing process of the invention.

The effect of the twisting is to move one of the ends in rotation through an angle $\alpha$ with respect to the other, as shown in FIG. 4 where the fiber has undergone twisting of $\alpha/2\pi$ turns per meter.

Figure 5:
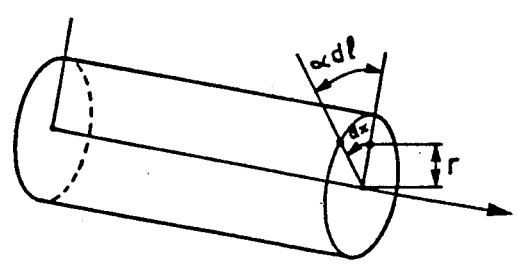

This rotation is spread uniformly over the length of the fiber, so that between two planes separated by a length dl, the axis rotation is $\alpha dl$. Over a section of the fiber, the movement of any point is then $\alpha dl r$, where r represents the distance from the point considered to the center of the fiber as shown in FIG. 5.

Figure 6:
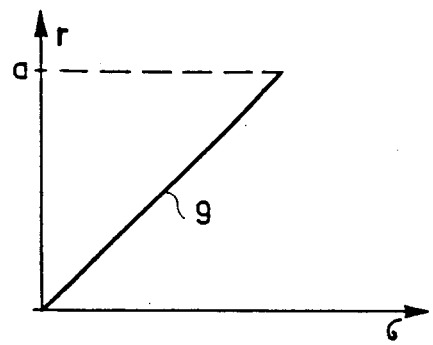

The field of stresses is then a twisting field, whose intensity $\sigma$ is given by the formula:

$$\sigma = \mu r \alpha$$

where $\mu$ is the module of rigidity to sliding, whose variation curve is shown in FIG. 6 where the distance a represents the radius of the fiber.

Figure 7:
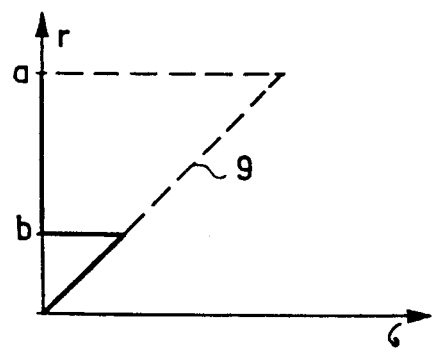

If then a part of the fiber is remelted, while maintaining the position of all the points of the fiber, the field of the stresses will be zero in the remelted part; which explains the new variation curve shown in FIG. 7, where distance a-b represents the remelting depth.

Then the fiber is released, that is to say that the twisting which was imparted is removed. A balance is then established, so that the total torque applied to the fiber is zero. There is then produced a twist opposite that applied at the beginning, and which counterbalances the residual twist after remelting. The fiber undergoes then a twist $-\beta$; which induces a field of stresses which at each point is equal to $-\beta\mu r$. This field is such that the total moment is zero:

$$\int_o^b (\alpha\mu r) \cdot r \cdot 2\pi r \, dr - \int_o^a (\beta\mu r) \cdot r \cdot 2\pi r \cdot dr = 0$$

where $\mu r$ represents the stress; $(\alpha\mu r)$ r the moment of the stress;

$$\int_o^b (\alpha\mu r) r \cdot 2\pi r \cdot dr$$

the integration on a ring of radius r and thickness dr. The same goes for the second term which uses $\beta$, giving the equation:

$$\frac{\pi\alpha\mu b^4}{2} - \frac{\pi\beta\mu a^4}{2} = 0$$

which is reduced to $\alpha b^4 - \beta a^4 = 0$

Figure 8:
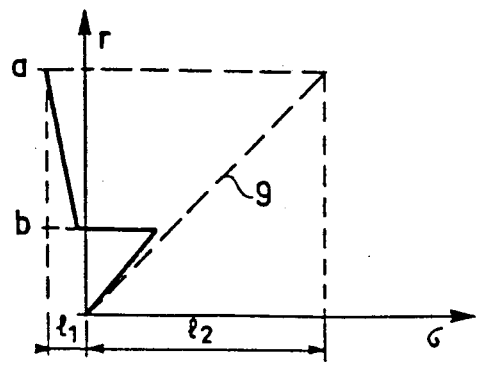

Thus, if the melting depth is 45 micrometers for a fiber with a radius of 60 micrometers ($a = 60\mu$, $b = 15\mu$) the ratio between the twisting angles will then be:

$$\alpha/\beta = a^4/b^4 = 256$$

a shown in FIG. 8, where layer 9 represents the curve before remelting. The stresses at the surface of the fiber are thus divided by 256, whereas in the useful part (non remelted part) they are multiplied by $$\left(1 - \frac{1}{256}\right).$$

Thus, the stresses at the surface of the fiber may be neglected and the reduction of the stresses in the core of the fiber may be neglected. The material after remelting remains in place.

Figure 9:
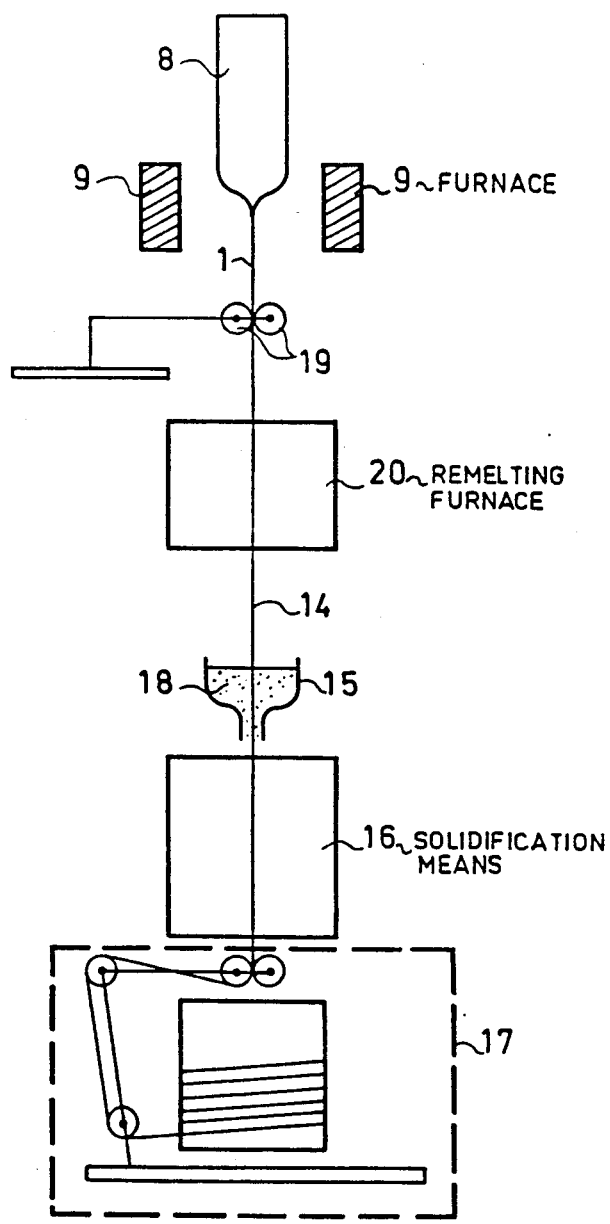
FIG. 9 illustrates a device for implementing the process of the invention.

A device for implementing this process is shown in FIG. 9. This figure illustrates the different elements of a fiber drawing machine using the process of the invention. These different elements are the following: a preform 8 which is positioned inside the melting means 9, which may be a blow-torch, a Joule effect oven, a high, medium or low frequency induction oven, is at the origin of fiber 1. These melting means 9 soften the preform 8. The material begins to flow and a fiber 1 is obtained by drawing and twisting.

The first element after the drawing oven is such that the twist applied to the fiber is not absorbed by the drawing cone. It is for example pulleys 19 coated with a non-slip material (rubber, silicon) in which the fiber may not slide. The remelting oven allows a part of the volume of fiber 1 situated at the periphery thereof to be remelted. Coating may then be carried out with coating means 15 of a protecting material 18 which may be plastic or metal. Device 16 ensures solidification of the protecting layer of material 18 applied by coating means 15. The gantry supplying a twisting stress to the fiber is a winding drum 17. This drum 17 imparts to the fiber a number of twisting turns proportional to the drawing speed of a fiber drawing device so as to draw and twist the fiber during manufacture thereof.

The remelt oven may be conceived in different ways: an induction oven, a graphite oven may for example be used.

Figure 10:
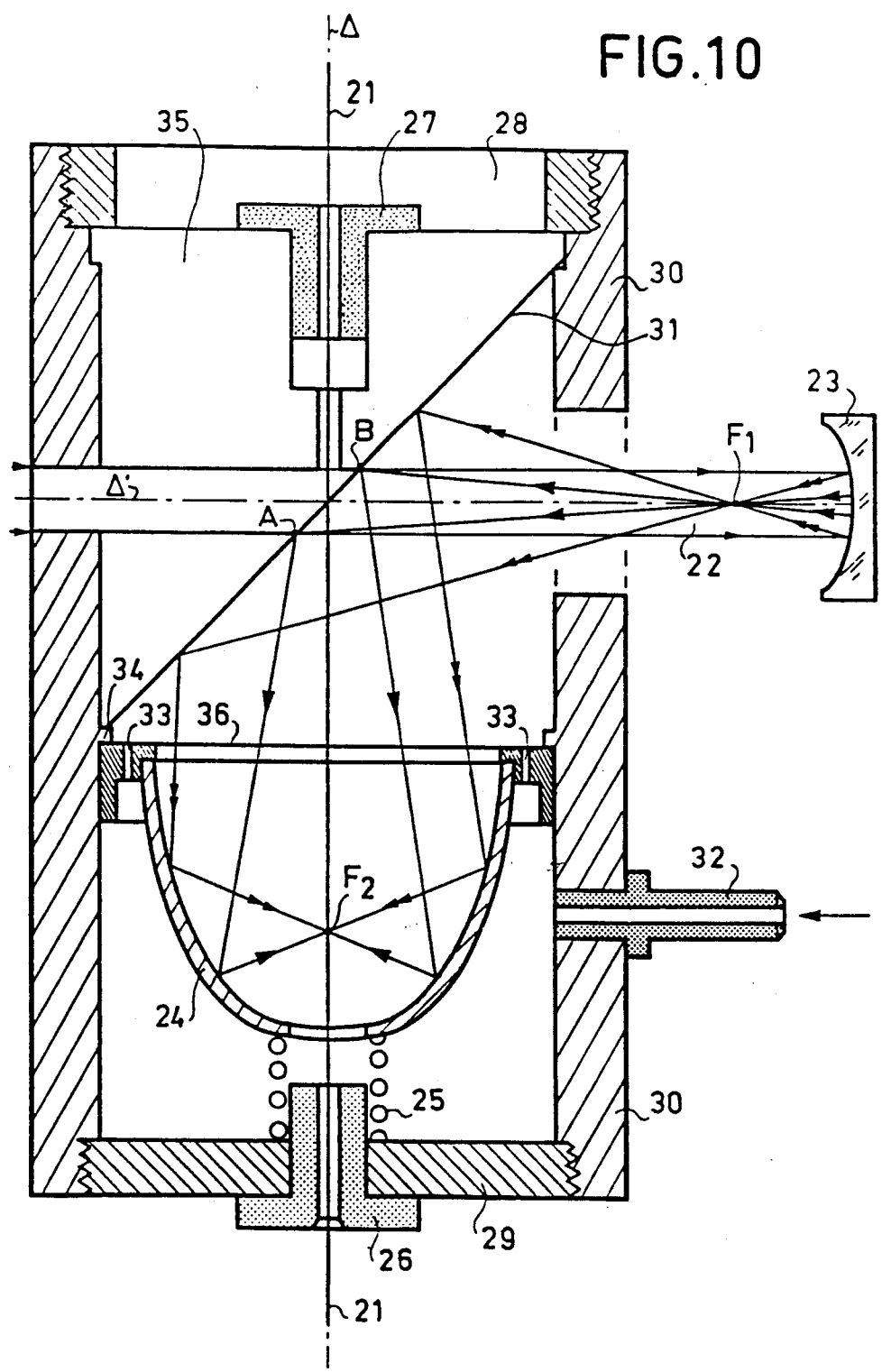
FIG. 10 illustrates a particular aspect of the device illustrated in FIG. 9.

A carbon dioxide ($CO_2$) laser may also be used for example. The beam is directed on to a parabolic (or spherical mirror) which, reflected to an ellipsoidal mirror, concentrates the energy in a ring surrounding the fiber as shown in FIG. 10. This device allows the fiber to be melted with very low laser powers (10 watts) and to obtain good symmetry of revolution of the heating.

The depth of remelting may be controlled by measuring the torque applied by the fiber to the gripping pulleys.

What is claimed is:

1. A process for manufacturing a glass fiber keeping circular polarization, comprising the steps of:
    drawing a homgeneous glass fiber from a source containing molten glass,
    allowing said glass fiber to solidify throughout, and conveying the fiber to a fiber take-up means,
    twisting said solidified glass fiber about its axis uniformly in a region defined between said source and said fiber take-up means,
    subjecting said twisted glass fiber to a remelting step where only the peripheral layer of said fiber is remelted along the entire length of the fiber, while the core of the fiber remains under twisting stress, and then
    permitting said remelted peripheral layer to solidify along the entire length of the fiber, while the core of the fiber remains under twisting stress,
    whereby said solidified peripheral layer is substantially free of twisting stresses, and the remaining twisting stresses are substantially borne by the core of said fiber.

2. The process of claim 1 including an additional step of coating said glass fiber with a protective material subsequent to the solidification of said peripheral layer.

3. The process as claimed in claim 2, wherein said protecting material is plastic.

4. The process as claimed in claim 2, wherein said protecting material is metal.

* * * * *